March 28, 1961 T. R. SLIKER 2,977,545
SAWTOOTH GENERATOR
Filed Sept. 11, 1959
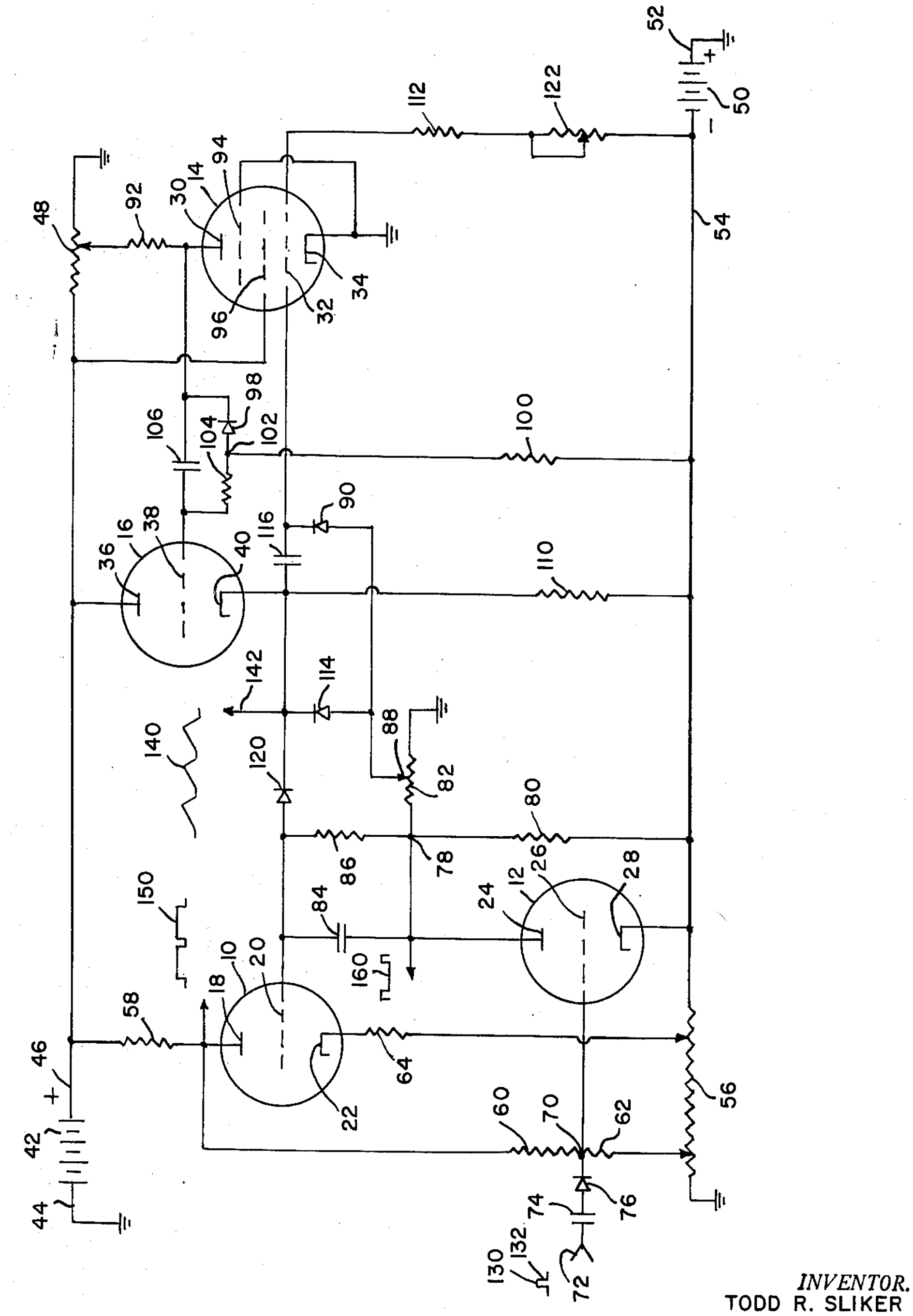
INVENTOR.
TODD R. SLIKER
BY
Wade Koontz
S. A. Strickland Jr.
ATTORNEYS 2,977,545

SAWTOOTH GENERATOR

Todd R. Sliker, East Rochester, N.Y., assignor to the United States of America as represented by the Secretary of the Air Force Filed Sept. 11, 1959, Ser. No. 839,541

6 Claims. (Cl. 328—184)

(Granted under Title 35, U.S. Code (1952), sec. 266)

The invention described herein may be manufactured and used by or for the United States Government for governmental purposes without payment to me of any royalty thereon.

This invention relates to a combination multivibrator sawtooth generator circuit and, particularly to a sawtooth generator providing a linear waveform and having a constant amplitude regardless of duration of the wave.

In the utilization of sawtooth waveforms, it is desirable to have a wave with a linear rise and fall and having all waves start at the same base line and have a constant amplitude, regardless of the duration of the wave. It is likewise desirable to have a generator which can only be triggered when the sawtooth waveform has returned to its base. It is also desirable to have a sawtooth waveform, which is adjustable in duration and which is stable when adjusted. Also, it is desirable to have a generator which will provide rectangular waveforms of opposite polarity, which rise and fall at the beginning and end of the sawtooth wave.

Heretofore, considerable difficulty has been encountered in providing linear sawtooth waveforms. Also, difficulty has been encountered because of premature triggering, which starts a new waveform before the preceding form has returned to base level. Several circuits have been heretofore utilized for providing a substantially linear waveform. For example, the circuit known as the phantastron provides a sawtooth waveform that is of constant amplitude, even though the time duration of the sawtooth varies. However, phantastrons are characterized by a negative jump or step at the beginning of the sawtooth waveform. Moreover, a phantastron does not reject trigger pulses at a time while the sawtooth is returning to its base level. Finally, the phantastron does not make available rectangular trigger waveforms of opposite polarity, which rise and fall at the beginng and end of the sawtooth. Substantially proper waevforms can be generated by a multivibrator followed by a Miller integrator or bootstrap circuit followed by hold off cathode followers, which control the input level of the multivibrator. However, this method requires considerably more components than the present invention.

In the construction, according to the present invention, a multivibrator is triggered by an input impulse to provide a control potential to the grid of a control tube which in turn supplies a control potential to an output tube which provides the sawtooth waveform, which is applied through a diode to apply the sawtooth waveform minus the Zener voltage of the diode to trigger the multivibrator to reset.

It is accordingly an object of the invention to provide an improved sawtooth wave generator.

It is another object of the invention to provide a sawtooth wave generator having a constant amplitude and an adjustable time duration.

It is a further object of the invention to provide a sawtooth wave generator which provides rectangular trigger potentials in synchronism with the sawtooth waveform.

Other objects and advantages of the invention will be apparent from the following detailed description taken in conjunction with the accompanying drawing in which the figure is a schematic diagram of a multivibrator sawtooth generator according to the invention.

In the exemplary embodiment according to the invention the electronic tubes 10 and 12 are connected to provide a multivibrator which triggers a control tube 14, which in turn triggers an output tube 16. The first tube 10 of the multivibrator has an anode, or plate, 18, a control grid 20 and a cathode 22. The second tube 12 of the multivibrator has an anode, or plate, 24, a control grid 26 and a cathode 28. The control tube 14 is provided with a plate, or anode, 30, a control grid 32 and a cathode 34, and the output electronic tube 16 is provided with the plate, or anode, 36, the control grid 38 and the cathode 40.

A source of potential 42 has the negative terminal 44 grounded and the positive terminal 46 grounded through a voltage divider 48. Likewise, a source of potential 50 has its positive terminal 52 grounded and the negative terminal 54 grounded through a voltage divider 56 so that we have a positive potential and a negative potential both returned to ground to provide a substantially continuous supply potential.

The anode 18 of tube 10 is connected to the positive terminal 46 through a load resistor 58. Also, the anode 18 is connected through a voltage divider having sections 60 and 62 to a variable contact in the voltage divider 56. Cathode 22 is connected through a resistor 64 to an adjustable point in the voltage divider 56.

The cathode 28 of the second tube of the multivibrator is connected to the negative terminal 54 of the supply potential. Grid 26 of tube 12 is connected to an intermediate point 70 of the voltage divider 60 and 62 and a trigger connection 72 is applied through a capacitor 74 and a unidirectional conductor, such as the diode 76, to provide an alternating current coupling from the input 72 to the point 70 of the voltage divider and to the control grid 26 of electron tube 12. The anode 24 of tube 12 is connected to an intermediate point 78 of a voltage divider comprising a resistance 80 and 82 connected from the negative terminal 54 to ground. An alternating current coupling from anode 24 to control grid 20 is provided by the capacitor 84 and a direct current coupling from the anode 24 to the grid 20 is provided by the resistor 86.

An intermediate point 88 of resistor 82 is connected to the grid 32 of control tube 14 by means of a unidirectional conductor, such as the diode 90, and returned to the negative supply terminal by limiting resistor 112. The anode 30 of control tube 14 is connected to a variable point in the voltage divider 48 by means of a resistor 92 to provide a selected positive potential. The cathode 34 of control tube 14 is directly connected to ground and to the suppressor electrode 94, while a screen grid 96 is connected to the positive supply terminal 46.

A bias voltage generator comprises a diode 98 and a resistor 100 connected in series relation between the plate 30 and the negative terminal 54. An intermediate point 102, between the diode 98 and resistor 100, is connected to grid 38 of the output tube 16 over the resistor 104. The resistor 104 and the capacitor 106 are connected in shunt across the diode 98 so that the Zener voltage across the diode 98 reduces the potential applied to the grid 38 from anode 30 by the amount of the said Zener voltage.

The anode 36 of tube 16 is directly connected to the positive supply terminal 46 and the cathode 40 is connected to the negative supply terminal 54 over resistor 110. The cathode 40 of tube 16 is supplied with potential from the resistor 82 from a point such as point 88 over a unidirectional conductor, such as the diode 114, so that cathode 40 is elevated above the potential of terminal 54 by the potential applied over the diode 114. Cathode 40 is likewise connected to grid 32 by means of a capacitor 116. Cathode 40 is further connected to the grid 20 of tube 10 over the diode 120.

The operation of the system is as follows:

In the normal or quiescent state, electronic tube 10 is conducting and electronic tube 12 is cutoff. Power supply voltage of terminal 54, resistor 80, and resistor 82 are selected so that a negative voltage will be at the plate of electronic tube 12 sufficient to cutoff electronic tube 14. A certain current will flow from the variable center tap 88 of resistor 82, through diode 90, through resistor 112, and variable resistor 122 to the negative power supply terminal 54. The setting of the variable center tap 88 of resistor 82 controls the voltage on the control grid 32 of electronic tube 14. Diode 98 is such that its Zener voltage is exceeded by the voltage on the plate 30 of electronic tube 14 and power supply voltage of terminal 54. Resistor 100 limits the Zener current. Resistor 104 and capacitor 106 act as a compensating network for diode 98. Hence, the control grid voltage of electronic tube 16 will be less than the plate voltage of electronic tube 14 by an amount equal to the Zener voltage of diode 98. Electronic tube 16 acts as a cathode follower. The setting of the variable center tap 88 of resistor 82 is made so that electronic tube 16 is partially cutoff by current flowing from the variable center tap 88 of resistor 82, through diode 114, and through resistor 110 to negative power supply terminal 54.

Assume that a positive trigger 130 is applied to the input 72. This positive trigger is alternating current coupled through capacitor 74 to diode 76. Because of the orientation of diode 76, the positive trigger 130 drives the voltage of control grid 26 of electronic tube 12 more positive. Because of the orientation of diode 76, the negative going edge 132 of the positive trigger 130 will not affect the voltage of control grid 26 of electronic tube 12. If the input trigger pulse 130 is of sufficient amplitude, the voltage on the control grid 26 of electronic tube 12 will increase to a value where electronic tube 12 begins to conduct. As electronic tube 12 begins to conduct, the voltage on the plate 24 of electronic tube 12 will begin to decrease, causing the voltage on control grid 20 of electronic tube 10 to decrease because of alternating current coupling through capacitor 84 and direct current coupling through resistor 86. Therefore, electronic tube 10 will begin to cutoff, causing the plate voltage of electronic tube 10 to increase, causing the control grid voltage of electronic tube 12 to increase because of direct current coupling through resistor 60. Therefore, a positive trigger 130 of sufficient amplitude will cause a regenerative switching action (hereinafter called the first regenerative switching action) to take place which ends when electronic tube 12 becomes fully conducting and electronic tube 10 becomes fully cutoff. The final plate voltage of electronic tube 12 is such that and diode 120 is selected so that the Zener breakdown voltage of diode 120 is exceeded after the first regenerative switching action has taken place. The Zener current is limited by resistor 86. Hence, the control grid voltage of electronic tube 10 will be less than the cathode voltage of electronic tube 16 by an amount equal to the Zener voltage of diode 120.

When electronic tube 12 begins to conduct, the voltage at the variable center tap 88 of resistor 82 begins to decrease, cutting off diodes 90 and 114. The control grid 32 of electronic tube 14 and the cathode 40 of electronic tube 16 then begin to seek new voltage levels. When the control grid voltage of electronic tube 14 starts decreasing toward the negative voltage power supply terminal 54, the voltage of plate 30 of electronic tube 14 starts increasing to cause the voltage on the control grid 38 and cathode 40 of electronic tube 16 to increase. The increasing voltage on the cathode 40 of electronic tube 16 is alternating current coupled back to the control grid 32 of electronic tube 14 through capacitor 116 to keep the control grid voltage of electronic tube 14 constant. However, capacitor 116 is being charged by current flowing through resistors 112 and 122 to negative power supply terminal 54. Because the voltage of control grid 32 of electronic tube 14 remains constant the voltage at the cathode 40 of electronic tube 16 increases linearly. Resistor 122 controls the slope of the linear rise of voltage wave form 140 on the cathode 40 of electronic tube 16. Series resistor 112 provides protection for diode 90 in the event that variable resistor 122 should be decreased to zero resistance.

The voltage on the cathode 40 of electronic tube 16 and hence the voltage on the control grid 20 of electronic tube 10 continues to rise linearly until electronic tube 10 begins to conduct, causing the plate voltage of electronic tube 10 to decrease. Hence, the voltage on control grid 26 of electronic tube 12 decreases because of coupling through resistor 60, electronic tube 12 begins to cutoff, causing the voltage on plate 24 of electronic tube 12 to increase. Thus, the voltage on control grid 20 of electronic tube 10 will increase because of coupling through capacitor 84 and resistor 86. Therefore, regenerative switching action will take place (hereinafter called the second regenerative switching action) until electronic tube 12 is cutoff and electronic tube 10 is conducting.

When electronic tube 12 becomes sufficiently cutoff, the voltage at the variable center tap 88 of resistor 82 will exceed the voltage on the control grid 32 of electronic tube 14, causing current to flow through diode 90 to increase the voltage on the control grid 32 of electronic tube 14, causing the voltage on plate 30 of electronic tube 14 to decrease, causing the voltage on control grid 38 of electronic tube 16 to decrease, causing the voltage on cathode 40 of electronic tube 16 to decrease. The voltage on cathode 40 of electronic tube 16 continues to decrease until exceeded by the voltage on the variable center tap 88 of resistor 82 at which time current begins to flow through diode 114 and resistor 110 so that electronic tube 16 will be partially cutoff.

Before the arrival of the trigger pulse, a grid current, limited by resistor 86 flows from the plate 24 of electronic tube 12, through resistor 86, to the control grid 20 of electronic tube 10. Thus, the control grid 20 of electronic tube 10 will be slightly positive with respect to the cathode 40 of electronic tube 10 so that electronic tube 10 will be fully conducting.

However, during the second regenerative switching action, the voltage on plate 24 of electronic tube 12 is positive going and the voltage on control grid 20 of electronic tube 10 will be driven very positive with respect to the cathode 40 of electronic tube 10 because of coupling through capacitor 84. The voltage on the control grid 20 of electronic tube 10 will then decrease exponentially toward a final value that is slightly positive with respect to the cathode 22 of electronic tube 10 at a rate determined by the value of capacitor 84 and the input control grid resistance of electronic tube 10. During the brief time that the voltage on control grid 20 of electronic tube 10 is very positive with respect to the voltage of cathode 20 of electronic tube 10, electronic tube 10 will be more highly conducting and the voltage on the plate 18 of electronic tube 10 will be lower than before the arrival of the positive trigger 130. Hence, because of coupling through resistor 60, the voltage on the control grid 26 of electronic tube 12 will, for a brief time, be lower than just before the arrival of the trigger pulse 130. By proper adjustment of the amplitude of the positive truigger pulse 130, trigger pulses which arrive during the brief period when the voltage on the control grid 26 of electronic tube 12 is lowest will not be of sufficient amplitude to cause electronic tube 12 to begin conducting and start the first regenerative switching action. By proper selection of capacitor 84, the brief period can be made to exceed the time required for the sawtooth 140 to return to its base level. Hence, only trigger pulses 130 that arrive when the sawtooth 140 is at its base level will cause the first regenerative switching action to take place.

Resistor 62 is the second half of resistance divider 60 and 62. Resistor 58 is the load resistance for electronic tube 10. Resistor 64 provides cathode bias for electronic tube 10. Point 142, or cathode 40 of tube 16, is the low impedance output for the sawtooth 140. Resistor 92 is the load resistance for electronic tube 14. A rectangular waveform 150 that is high when the sawtooth is being produced and low when the sawtooth is at its base level can be obtained at the plate 18 of electronic tube 10. A rectangular waveform 160 of opposite polarity can be obtained at the plate 24 of electronic tube 12.

For purpose of exemplification, a particular embodiment according to the invention has been shown and described according to the best present understanding thereof. However, it will be apparent, to those skilled in the art, that various changes and modifications in the construction and arrangement of the parts thereof may be resorted to without departing from the true spirit and scope of the invention.

I claim:

1. A sawtooth generator system comprising a multivibrator having a first and second controlled electronic device, each of said devices having an anode, a cathode and a control electrode, a direct current coupling from the anode of said first device to the control electrode of said second device, an alternating current coupled trigger circuit connected to the control electrode of said second device, an alternating current and a direct current coupling from the anode of said second device to the control electrode of said first device, a source of supply potential having positive and negative terminals, means including a voltage divider for impressing a negative potential from said source on the anode of said second device, a control tube including a control electrode, a variable tap engaging said voltage divider, circuit means including a unidirectional conductor and a resistor connecting said control electrode in series between said variable tap and a negative terminal of said source of supply potential, an output tube, a control electrode in said output tube, a diode and a resistor connected in series circuit relation between the anode of said control tube and said negative terminal of said source of supply potential, a connection from the junction of said diode and said resistor for impressing on said control electrode of said output tube a potential less than the anode potential of said control tube by the Zener voltage of said diode, a load impedance between the cathode terminal of said output tube and a negative terminal of said source of supply potential, a connection including a second diode for impressing a control potential on the control electrode of the second tube that is less than the potential of the cathode terminal of the said output tube by the Zener potential of said second diode.

2. A sawtooth generator comprising a multivibrator including a first and second grid controlled electronic tube, a source of supply potential having positive and negative terminals, a trigger circuit, an alternating current coupling between said trigger circuit and the grid of said second electronic tube, means including a voltage divider having one terminal connected to a negative terminal of said source of supply potential for impressing a negative potential on the plate of said second electronic tube, a control tube including a control grid, a tap contacting said voltage divider, a control circuit including in series circuit relation said tap, a unidirectional conductor, said control grid, a resistor and said negative terminal of said source of supply potential, a biasing potential circuit extending from the plate of said control tube to said negative terminal of said source of supply potential, said biasing circuit including in series circuit relation a diode and a resistor, an output tube including a control electrode, a connection from the junction between said diode and said resistor to said control electrode in said output tube whereby the potential on the control electrode of said output tube is equal to the anode potential of said control tube less the Zener voltage of said diode, a connection from the cathode of the output tube to the grid of said first electronic tube, said connection including a second diode whereby the potential at the grid of said first electronic tube is equal to the cathode potential of said output tube less the Zener voltage of said second diode.

3. A sawtooth generator comprising a multivibrator including a first and second triode, each of said triodes including a plate, a control grid and a cathode, a source of supply potential having positive and negative terminals, a trigger circuit, an alternating current coupling between said trigger circuit and said control grid of said second triode, means including a voltage divider having one terminal connected to a negative terminal of said source of supply potential for impressing a negative potential on the plate of said second triode, a control tube including a third control grid, an anode and a cathode, a tap in said voltage divider, a control circuit including in series circuit relation said tap, a unidirectional conductor, said third control grid, a resistor and a negative terminal of said source of supply potential, a biasing potential circuit extending from the plate of said control tube to said source of supply potential, said biasing circuit including in series circuit relation a diode and a resistor, an output tube including a control electrode and a cathode, a connection from the junction between said diode and said resistor to said control electrode whereby the potential on the control electrode is equal to the anode potential of the control tube less the Zener voltage of said diode, a connection from the cathode of the output tube to the grid of said first diode, said connection including a second diode whereby the potential at the grid of said first triode is equal to the cathode potential of said output tube less the Zener voltage of said second diode, a capacitor connected between the cathode of said output tube and the third control grid of said control tube, and means for controlling the charging rate of said capacitor.

4. A sawtooth generator system comprising a multivibrator having a first and second controlled electronic device, each including an input, an output and a control electrode, a direct current coupling from the input electrode of said first electron device to the control electrode of said second electron device, an alternating current trigger circuit coupled to the control electrode of said second electron device, an alternating current and a direct current coupling from the plate electrode of said second electron device to the control electrode of said first electron device, a source of supply potential, means including a voltage divider for impressing a negative potential from said source on the plate electrode of said second electron device, a control tube including a control electrode and a plate electrode, a variable tap in said voltage divider, circuit means including a unidirectional conductor and a resistor for connecting said control electrode in series between said variable tap and a negative terminal of said source of supply potential, an output tube, a control grid in said output tube, a diode and a resistor connected between the plate electrode of said control tube and a negative terminal of said source of supply potential, a connection from the junction of said diode and said resistor to the control grid of said output tube for impressing on the control grid of said output tube a potential less than the plate electrode potential of said control tube by the Zener voltage of said diode, a load impedance between the cathode of the output tube and a negative terminal of said source of supply potential, a connection from the cathode of said output tube to the control electrode of said first electron device including a second diode for impressing a potential on the control electrode of said first electronic device that is less than the potential of the cathode of the output tube by the Zener potential of the last mentioned diode, and a timing circuit connected from the cathode of said output tube to the control electrode of said control tube.

5. A linear sawtooth voltage generator system comprising a multivibrator including a first and second tube, each of said tubes including an anode, a cathode and a control grid, circuit means for impressing a positive anode potential on said first tube, connections including a first voltage divider for impressing a potential on the anode of said second tube, an alternating current and a direct current coupling between the anode of said second tube and the control grid of said first tube, means including a second voltage divider connected between the anode of said first tube and a source of negative potential for impressing a control potential on the grid of said second tube, a control tube including an anode, a cathode and a control grid, circuit means including a unidirectional conductor for impressing a voltage from said first voltage divider on the control grid of said control tube, means including a load impedance for impressing a potential on the anode of said control tube, a diode and an impedance connected between the anode of said control tube and a source of negative potential, an output tube including a cathode, an anode and a control electrode, a connection including said diode from the anode of said control tube to the control electrode of said output tube for applying a potential to said control electrode which is less than the anode potential of said control tube by an amount equal to the Zener voltage of said diode, a connection from the cathode of said output tube to the grid of said first tube, said connection including a second diode so polarized that the potential applied to said grid from said output tube is less than the cathode voltage of said output tube by the Zener voltage of said second diode, a connection including a capacitor between the cathode of said output tube and the grid of said control tube and means for controlling the charging current of said capacitor.

6. A linear sawtooth generator system comprising a multivibrator including a first and second electron tube, a control tube and an output tube, each of said tubes including an anode, a cathode and a grid, a trigger connection to the grid of said second tube, means including a voltage divider for applying a potential to the anode of said second tube, an intermediate tap in said voltage divider, a biasing circuit from said tap to the cathode of said output tube, a second biasing circuit from said tap to the grid of said control tube, a unidirectional conductor in each of said biasing circuits, a return connection from the grid of said control tube to a source of negative potential, a resistor in said return circuit, a bias voltage generator circuit extending from the anode of said control tube to a source of negative potential, said generator circuit including a diode and a resistor in series circuit relation, a connection from a point between said diode and said resistor to the grid of said output tube, a diode connected between the cathode of the output tube and the grid of said first tube, a capacitor connected between the cathode of said output tube and the grid of said control tube.

References Cited in the file of this patent

UNITED STATES PATENTS 2,645,715 Weller et al. ............ July 14, 1953
2,905,819 Kleinman ............ Dec. 22, 1959